M. GARL.
AUTOMOBILE SIGNAL.
APPLICATION FILED MAR. 27, 1917.
1,271,696.
Patented July 9, 1918.
2 SHEETS—SHEET 2.
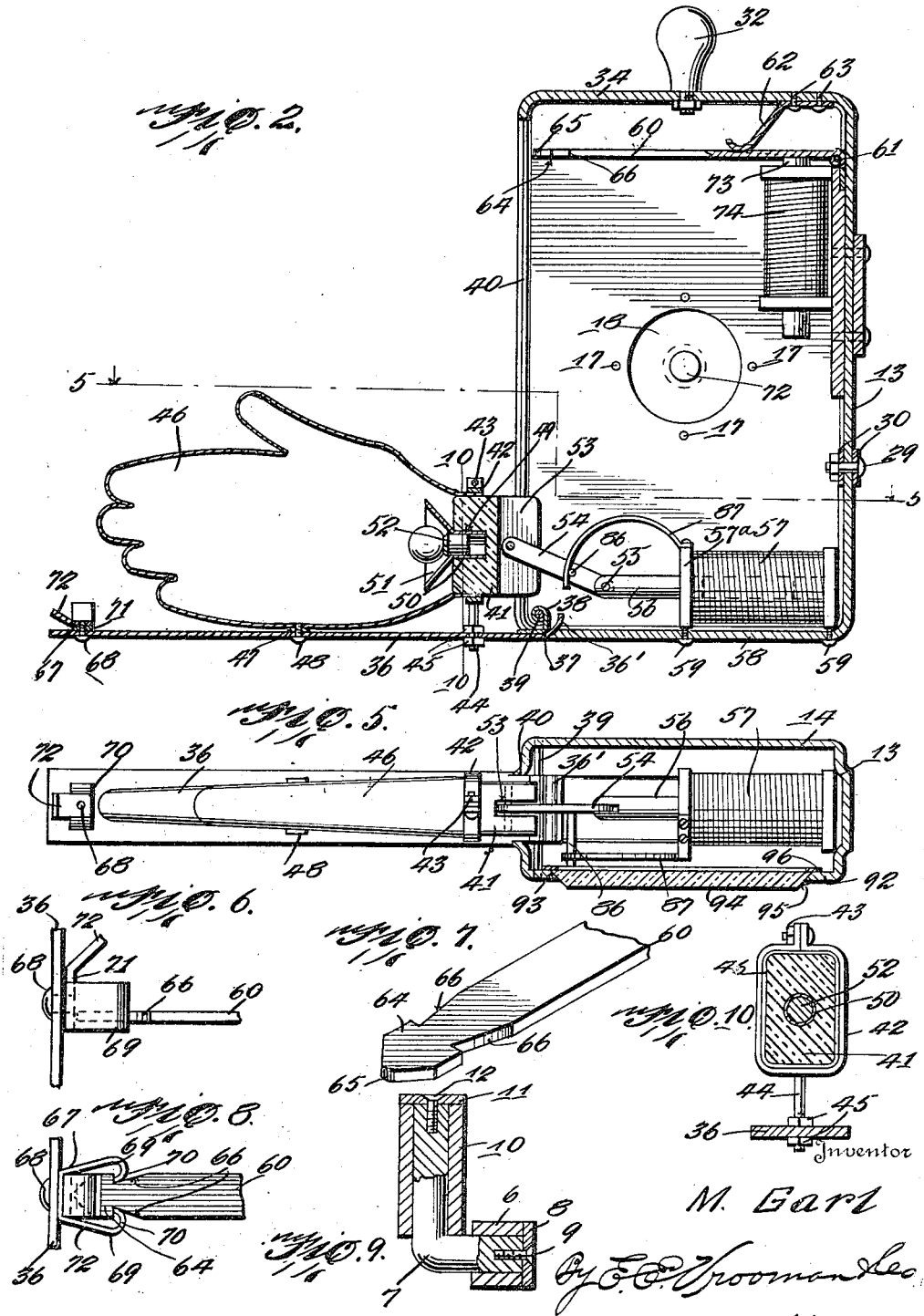

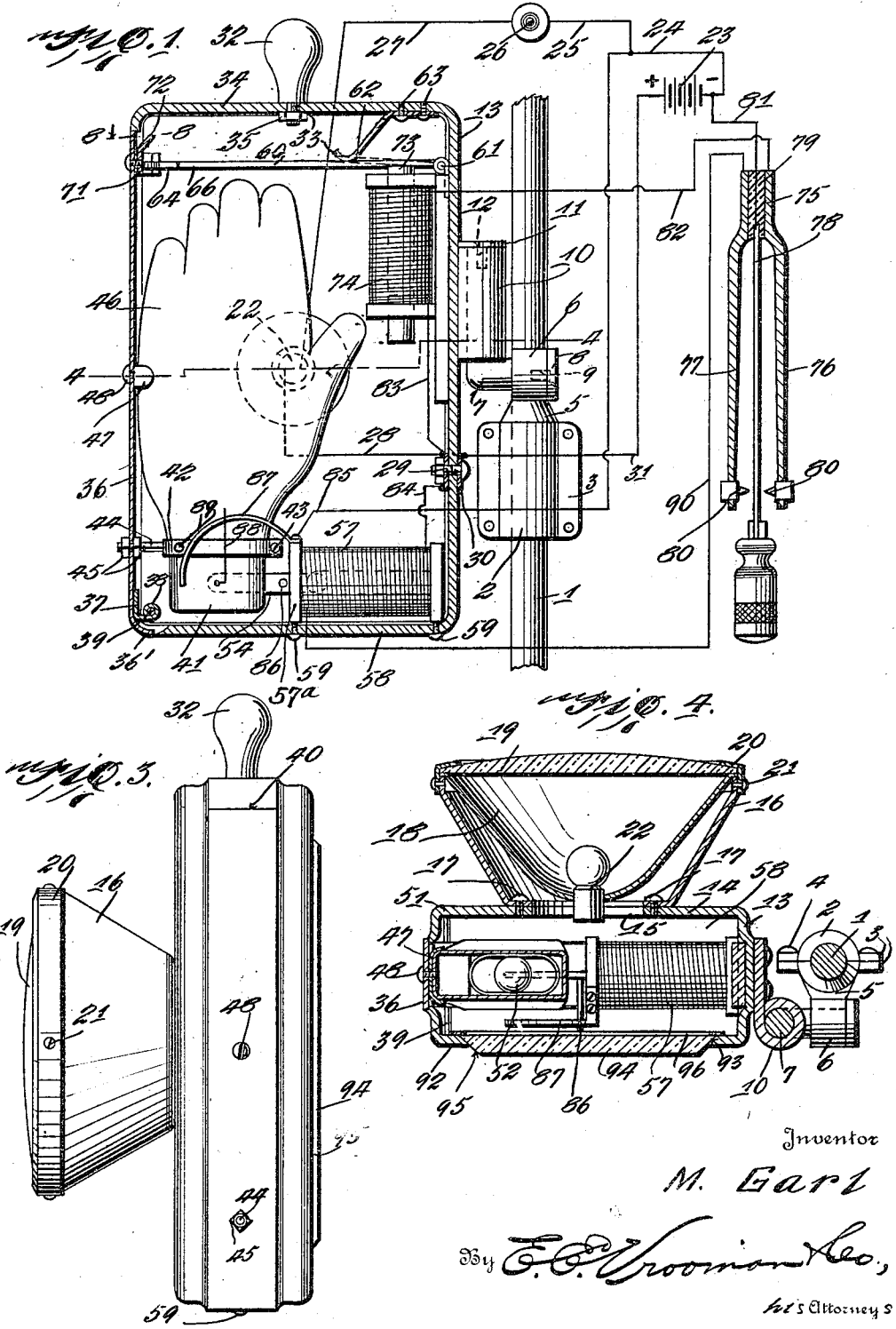

UNITED STATES PATENT OFFICE.

MANIOUS GARL, OF AKRON, OHIO.

AUTOMOBILE-SIGNAL.

1,271,696.   Specification of Letters Patent.   Patented July 9, 1918.

Application filed March 27, 1917. Serial No. 157,730.

*To all whom it may concern:*

Be it known that I, MANIOUS GARL, a citizen of the United States of America, residing at Akron, in the county of Summit and State of Ohio, have invented certain new and useful Improvements in Automobile-Signals, of which the following is a specification, reference being had therein to the accompanying drawing.

This invention relates to an automobile signal and has for its principal object the provision of simple and efficient means whereby the chauffeur of the machine upon which the signal is carried may readily operate the same so as to give a signal at the time he is about to turn or stop the automobile.

Another object of the invention is the production of an automobile signal of an electric nature which is positioned so that upon the closure of a certain switch the signal will be thrown to an operative position for giving notice of the direction in which the car upon which the same is mounted is about to turn or when it will stop.

A still further object of this invention is the production of a signal which is constructed so that the switch used for moving the signal to an operative position may be actuated subsequently to its original operation thus forming a new circuit for actuating the operating mechanism for again returning the signal to a closed position.

A still further object of this invention is the production of an electric signal which is provided with a locking means for releasably retaining the door upon which the signal is mounted in a closed position, this locking means being provided with an operating magnet of such nature as to cause the door to be released when the signal should be moved to an open position.

With these and other objects in view this invention consists of certain novel combinations, constructions and arrangements of parts as will be hereinafter fully described and claimed.

In the accompanying drawings:—

Figure 1 is a central vertical section through the automobile signal showing the same mounted upon its support, the wiring for the same being shown in diagram;

Fig. 2 is a central vertical section through the signal showing the signal in an open position, the wires being removed illustrating clearly the mechanical construction of the device;

Fig. 3 is a side elevation of the automobile signal;

Fig. 4 is a transverse section through the signal in a closed position taken on the line 4—4 of Fig. 1.

Fig. 5 is a transverse section through the signal shown in an open position taken on the line 5—5 of Fig. 2, looking in the direction of the arrow;

Fig. 6 is a side elevation of a portion of the locking means;

Fig. 7 is a fragmentary detail perspective view of the free end of the locking arm;

Fig. 8 is a fragmentary section taken on the line 8—8 of Fig. 1 looking in the direction of the arrow;

Fig. 9 is a fragmentary sectional view through a portion of the support for the signal;

Fig. 10 is a section taken on the line 10—10 of Fig. 2.

Referring to the accompanying drawings by numerals it will be seen that the automobile signal is to be carried upon a supporting standard 1 as illustrated clearly in Fig. 1. This supporting standard 1 may constitute a part of the wind shield of an ordinary automobile or can be carried in any other suitable place upon the machine. Although it is desired to have the signal in such a position as to be in view of the chauffeur at all times so as to allow him to observe whether or not the signal is operating, it is of course obvious that the signal may be placed upon any portion of the automobile without departing from the spirit of the invention. It is also obvious that as many of the signals may be placed upon the automobile as may be desired although it is preferable to position such a signal upon each side of the automobile to indicate the direction the machine is about to turn or to indicate when it is about to stop. Since each signal would be similarly constructed only one signal has been shown in the present case for it is deemed that a description of one signal will be sufficient to disclose the construction of each.

The clamp as mounted upon the standard 1 comprises a pair of sections 2 having flanges 3 fitting upon each other thereby permitting the screws or bolts 4 to be passed through the flanges 3 for firmly supporting the clamp upon the standard 1 as shown in Fig. 4. The neck 5 projects from one of the sections 2 as shown in Fig. 1 and has a horizontally extending sleeve 6 formed integral upon its upper end. The L-shaped supporting knuckle 7 projects through the sleeve 6 as shown in Fig. 9 so as to permit a cap 8 to be held upon one end by means of the set screw 9. Thus it will be seen that although the knuckle 7 will be held in engagement with the sleeve 6 it will be free to rotate therein. This knuckle 7 also supports an elongated sleeve 10 and this sleeve 10 is held from being accidentally displaced by the cap 11 held in position by the set screw 12. This sleeve 10 is formed upon or secured in any suitable manner to the side 13 of the casing as shown in Fig. 1. As a consequence the fitting of the knuckle within the sleeve 6 will permit the casing 13 to be tilted in a vertical plane while the tilting of the knuckle within the sleeve 10 will permit the casing to be moved in a horizontal plane so as to permit the casing to be moved in any manner desired.

The side 13 of the casing has a front wall 14 formed integrally thereon and this front wall 14 has an opening 15 formed therein as shown in Figs. 2 and 4. The housing 16 is bolted or otherwise secured to the front wall 14 of the casing as shown at 17 and the reflector 18 is positioned within this housing 16. The usual lens 19 fits upon the reflector 18 and is held in position by means of a cap 1 secured as indicated at 12 in the housing 16. The lamp 22 is carried by the reflector 18 as shown in Fig. 4 or in any other suitable manner desired so as to permit the rays of light reflected by the lamp 22 to be projected through and beyond the lens 19.

In order to illuminate the lamp 22 constituting the search light there are provided suitable batteries 23 connected by the wire 24 to the wire 25 and the switch 26. The wire 27 extends from the switch 26 and is connected to the lamp 22 while the wire 28 leads from the lamp and is grounded upon the casing 13 by the bolt 29. The wire 31 leads from the bolt 29 of the casing 13 and is connected to the battery 23. Therefore it will be seen that as the circuit is closed by the closure of the push button switch 26 the current will pass from the batteries 23 over the wires 31, casing 13, wire 28, lamp 22, wire 27, push button 26 and wire 25 to wire 24 to battery 23. As the current passes through the lamp the lamp will be illuminated.

A grip 32 is provided with a threaded stem 33 which projects through the top 34 of the casing 13 as shown in Figs. 1 and 2 so as to carry a nut 35. Thus it will be seen that the grip 32 will be firmly supported upon the top 34 of the casing so as to permit the operator to grasp the grip 32 for tilting or swinging the casing in any manner desired owing to the double pivot connection of the knuckle 7 so as to allow the rays of light to be projected from the lamp 22 through the lens 19 to be thrown upon any object or in any place desired.

The door 36 has a bracket 37 secured thereto in any suitable manner and this bracket 37 has a sleeve 38 formed thereon through which passes the pin 39 connected to the casing as illustrated clearly in Fig. 5. In this manner it will be seen that the door 36 is pivotally mounted upon the casing. The door opening 40 is comparatively narrow being no wider than the width of the door as shown in Fig. 5. The inner end of the door 36 is curved inwardly as indicated at 36' in Fig. 2 and this inwardly curved end will constitute a closure for the lower portion of the door opening 40 as shown in Fig. 1 when the door is in a closed position.

The non-conductive block 41 is retained by the strip 42 passing therearound as shown in Fig. 2. This strip 42 is held in a binding engagement with the block 41 by the bolt connection 43 as shown in Fig. 10. The stem 44 projects below the lower portion of the strip 42 and is provided with binding nuts 45 for holding the stem 44 in a positive engagement with the door 36. By referring particularly to Figs. 2 and 10 it will be seen that the block 41 is held in spaced relation with respect to the door 36. The indicating element 46 is positioned upon the door, this indicating element being formed of any color of celluloid or of perforated tin or like material and the inner end of this indicating element 46 fits within the clamping band 42 so as to cause the indicating element to be held against accidental displacement. It will also be noted that the clip 47 is held by a screw 48 upon the door 36 and this clip 47 engages the indicating element 46 intermediate its ends thus holding the indicating element against accidental displacement. The block 41 is provided with a socket portion 49 in which the socket 50 of the reflector 51 extends. A lamp 52 extends into this socket 50 so as to be supported within the interior of the hollow indicating element 40 as shown in Figs. 2 and 4. The block 41 is also bifurcated as shown at 53 so as to permit the link 54 to be pivotally connected thereto. This link 54 is connected as indicated at 55 to the outer surface 56 of the solenoid 57. The solenoid 57 is positioned in the casing fitting upon the bottom 58 of the casing and being retained in position by means of the screws 59. This solenoid 57 is adapted to draw the indicating elements to a closed position when the same is energized.

In order to hold the door against accidental falling to an open position the locking arm 60 is pivotally mounted as shown at 61 to the inner portions of the side 13 of the casing. This locking arm 60 is normally urged downwardly by means of the spring 62 retained by the screws 63 to the top 34 of the casing since this spring 62 bears at all times upon the locking arm 60 as shown in Figs. 1 and 2. This locking arm 60 is provided with a head 64 having a beveled end portion 65 while adjacent the head 64 are formed notches 66. The spring clip 67 is fixedly secured by the screw 68 to the door 36 adjacent its end as illustrated in Figs. 2, 5, 6 and 8. This clip 67 has side arms 69 terminating in overhanging lips 70. It will also be noted that the stop plate 71 having an overhanging end 72 is also supported upon the screw 68 so as to project above the clip 67 as shown in Fig. 6 while by fitting between the sides 69 of the clip the plates 71 will be held against side displacement. This overhanging end 72 is adapted to cause the door 36 to be forced outwardly as the end of the locking arm 60 is moved upwardly by the energization of the solenoid 74. When the doors move to a closed position the head 64 of the locking arm 60 will move between the overhanging ends 70 of the clip 67 after which these ends will spring to their normal positions so as to engage the notches 66 of the locking arm 60 thereby holding the door 36 from accidentally opening. When the locking arm 60 is moved upwardly however it will pass vertically through the clip 67 the overhanging end of the plate 70 starting the door 36 in its outward swinging movement. It should be understood that the door after being once started will drop to an open position through the force of gravity. In order to move this locking arm 60 upwardly when it is desired to release the door so as to permit the door to move to an open position the core 73 of the solenoid 74 bears upon the locking arm 60 as is shown in Fig. 2 and as a consequence when the solenoid is energized the core will move upwardly for lifting the free end of the locking arm thus causing the head 64 of this arm to disengage the socket and allow the door to move to an open position as above explained.

In order to permit the solenoids 74 to be energized there is provided a switch 75 having arms 76 and 77. The movable pole 78 is carried by the insulation 79 in any suitable manner as illustrated in Fig. 1. Each arm 76 and 77 is provided with contact points 80 for forming good contacts for closing a circuit when the movable pole 78 is moved into engagement with their contact points 80. Under normal conditions the door 36 will be closed and releasably held in a closed position by means of the locking engagement of the arm 60 and the socket 69 above specified. When it is desired to give a signal the movable pole 78 is swung to the right so as to close a circuit and at this time current from the batteries 23 will pass over the wire 31 to the ground on the casing 13, through the wire 83, through the solenoid 74, through the wire 82, through the arm 76, through the movable pole 78, through the wire 81 to the battery 23. In this manner it should be understood that the door 36 will be swung to an open position. As the door is swung outwardly to extend in a horizontal plane the pin 86 carried by the link 54 will come into engagement with the contact spring 87 mounted upon the insulating fiber 57ª of the solenoid 57. At this time the current will pass from the door 36 which is grounded with the positive side of the battery, up through the stem 44, through the band 42, through the wire 89, to light 52, through wire 88 to link 54, through pin 86, through spring 87 through wire 85, through wire 24 to battery 23. Since the lamp 52 will in this manner be illuminated the reflector 51 will increase the brilliancy of the rays of light and will project the light freely throughout the interior of the indicating element 46. As this indicating element is hollow and is formed either of transparent material or of perforated metal the indicating element will be illuminated so as to give the signal as at this time it will be extending to one side of the casing of the automobile signal. Thus if it is carried upon the right side of the automobile it will indicate that the automobile is about to turn to the right or if the casing is upon the opposite side of the autotmobile it will indicate that the automobile is about to turn to the opposite direction.

Where a pair of casings are carried upon the automobile body it is obvious that both signals may be simultaneously operated so as to throw the indicating elements to an operative position to indicate that the automobile is about to stop.

It is intended to have the movable pole 78 of the resilient construction so as to require the operator to hold the pole in a set position for forming a particular circuit and as soon as the operator releases the movable pole 78 the same will spring to its normal neutral position.

As soon as the pole 78 returns to its normal position the circuit above described is broken and as a consequence the light 52 will go out. At this time it is desirable to move the indicating element upwardly into the casing and move the door 36 to a closed position. In order to accomplish this function the pole 78 is swung into engagement with the remaining contact point 80 thus causing the current to flow from the battery 23 over the wire 31, casing 13, wire 84, solenoid 57, wire 90, arm 77, contact 80, movable pole 78, wire 81 to the battery 23. Of course when it is desired to bring the door 36 to a closed position such as shown in Fig. 1, the solenoid 74 will have been deënergized thereby permitting the arm 60 to assume its normal position. The circuits which have been described will be closed for the purpose of energizing the solenoid 57 and drawing the core of the solenoid inwardly. In this manner the door 56 will be swung inwardly and the latch 69 will fit over the latch head 64 of the arm 60 and thereby hold the door 36 in a securely closed position. When it is again desired to throw the signal to an open position the solenoid 74 is energized thereby moving the arm 60 upwardly and starting the door 36 in its downward swinging movement.

By referring particularly to Figs. 3 and 5 it will be seen that the rear wall 92 of the casing is provided with a beveled opening 93 so as to carry the mirror 94 having the bevel 95. This mirror is held within the opening 93 by means of a retaining band 96 fitting upon its inner portion and carried by the inner surfaces of the rear wall 92 as shown in Fig. 5. Since the casing is carried so as to extend to one side of the automobile upon which the same is supported and the beveled mirror 94 is supported by this casing the operator may readily observe the conditions of traffic in the rear of the automobile upon which the casing is supported by the disclosure of such traffic in the mirror 94.

From the foregoing description it will be seen that a very efficient automobile signal has been constructed which is provided with electrically operated means for releasing the door and moving the same to an open position and then causing the indicating element carried upon the door to be illuminated while a circuit is so arranged that upon the closing of the circuit the door will be returned to its closed position and locking means will again retain the door in a closed position.

It will also be seen that as the casing is mounted upon the standard so as to be free to pivot in either a horizontal or vertical plane the rays of light projected by the search light 22 may be thrown in any direction or upon any spot desired.

It is of course obvious that many minor changes may be made in the construction of this invention such for instance as the wiring of the system for operating the solenoids without departing from the spirit of the invention and it is therefore intended to include all such forms of the circuit as properly come within the scope of the claims.

What is claimed is:

1. In a signal of the class described the combination of a casing, a door pivotally mounted upon said casing, an indicating element carried by said door, a clip provided with a pair of jaws carried by said door, a door pivotally mounted upon said casing, a solenoid carried by said casing, a core carried by said solenoid and engaging said door, means for energizing said solenoid whereby said core will move said door to a closed position, and means adapted to be positioned between the jaws of said clip for retaining said door in a closed position.

2. In a signal of the class described the combination of a casing, a door pivotally mounted upon said casing, an indicating element positioned upon said door, a solenoid carried within said casing and having a sliding core, a link connected to said core at its outer end and to the inner end of said indicating element, and means for energizing said solenoid for drawing said core inwardly whereby said link will pull upon said indicating element for moving said door to a closed position.

3. In a signal of the class described the combination of a casing, a door carried by said casing, an indicating element carried by said door, solenoids carried within said casing, cores carried by said solenoids, means for releasably retaining said door in a closed position, one of said solenoids being adapted to operate said last-mentioned means for releasing said door, the other solenoid adapted to swing said door to a closed position, and the first mentioned solenoid being adapted to be deënergized for permitting said locking means to again retain the door in a closed position when the remaining solenoid moves the door to a closed position.

4. In a signal of the class described the combination of a casing, a solenoid carried by said casing and having a core, a link extending from said core, a door pivotally mounted upon said casing, an indicating element carried upon said door, a stem carried upon said door, a clamping band carried by said stem, a block carried by said clamping band, said link being connected to said block, a lamp partly supported within said block, and means for electrically connecting said lamp to said solenoid and said casing, whereby as said solenoid is energized it will swing said door to an open position and swing the circuit so as to cause said lamp to be illuminated.

5. In a signal of the class described the combination of a casing, a door pivotally mounted upon said casing, an indicating element carried by said door, a vertically-movable lock-arm pivotally mounted upon said casing, a spring carried by said casing and bearing upon said arm for normally urging said arm in one direction, a solenoid carried in said casing and having a core, a spring clip carried by said door and engaging said arm whereby said door will be retained in a closed position, said solenoid being adapted to be energized so as to urge said arm against the tension of said spring for causing said arm to disengage said clip whereby said door will be free to move, and means for moving said door to a closed position.

6. In a device of the class described, the combination with a casing provided with a movable door, of a catch provided with spring jaws attached to said door, a solenoid within said casing, a core movably mounted in said solenoid, and means engaged by said core and operated by the movement thereof and entering between the jaws of said clip for retaining the door in a closed position.

In testimony whereof I hereunto affix my signature.

MANIOUS GARL.